(12) United States Patent
Bird et al.

(10) Patent No.: US 11,697,344 B2
(45) Date of Patent: Jul. 11, 2023

(54) WHEEL END DISCONNECT ASSEMBLY AND VEHICLE HAVING A WHEEL END DISCONNECT ASSEMBLY

(71) Applicant: Ford Global Technologies, LLC, Dearborn, MI (US)

(72) Inventors: Norman Jerry Bird, Plymouth, MI (US); Steven Adam Hermann, Fenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 17/242,027

(22) Filed: Apr. 27, 2021

(65) Prior Publication Data
US 2022/0340004 A1 Oct. 27, 2022

(51) Int. Cl.
| | | |
|---|---|---|
| *B60K 17/35* | (2006.01) | |
| *B60K 23/08* | (2006.01) | |
| *B60K 1/02* | (2006.01) | |
| *B60K 1/00* | (2006.01) | |

(52) U.S. Cl.
CPC .......... *B60K 17/3515* (2013.01); *B60K 23/08* (2013.01); *B60K 1/02* (2013.01); *B60K 2001/001* (2013.01); *B60K 2023/0858* (2013.01)

(58) Field of Classification Search
CPC ...... B60K 17/3515; B60K 23/08; B60K 1/02; B60K 2001/001; B60K 2023/0858; B60K 1/00; B60K 2023/0825; B60K 17/354; B60K 17/356; B60K 17/02
See application file for complete search history.

(56) References Cited

U.S. PATENT DOCUMENTS

| 6,082,514 A | 7/2000 | Averill |
| 8,647,237 B2 | 2/2014 | Prix et al. |
| 9,022,192 B2 | 5/2015 | Quehenberger et al. |
| 9,383,008 B2 | 7/2016 | Anderson et al. |
| 9,784,321 B2 | 10/2017 | Pritchard |
| 9,915,298 B2 | 3/2018 | Heravi et al. |
| 10,544,838 B2 | 1/2020 | Quehenberger et al. |
| 11,371,589 B2 * | 6/2022 | Mock ..................... B60K 17/02 |
| 2010/0116076 A1 * | 5/2010 | Hoering ................. F16H 63/32 74/473.37 |

(Continued)

FOREIGN PATENT DOCUMENTS

| DE | 102014217066 | 3/2015 |
| WO | 2019219509 | 11/2019 |

*Primary Examiner* — Justin Holmes
(74) *Attorney, Agent, or Firm* — Burris Law, PLLC (57) ABSTRACT

A wheel end disconnect assembly includes a housing, a shift ring, a shift fork and an actuator. The shift ring is supported for axial translation relative to the housing between a connected position in which the shift ring couples an input member to a wheel hub for rotation therewith and a disconnected position in which the input member and the wheel hub are rotatable relative to each other. The shift fork includes a first arm portion, a second arm portion, and an input portion extending from a junction of the first and second arm portions. The shift fork is pivotably coupled to the housing at the junction of the first and second arm portions. The actuator is configured to move the input portion to pivot the first and second arm portions such that the first and second arm portions translate the shift ring between the connected and disconnected positions.

20 Claims, 10 Drawing Sheets

(56) References Cited

U.S. PATENT DOCUMENTS

| | | | |
|---|---|---|---|
| 2012/0018274 A1* | 1/2012 | Prix | F16H 61/0403 |
| | | | 192/84.1 |
| 2015/0034445 A1* | 2/2015 | Clohessy | B60K 23/08 |
| | | | 192/69.41 |
| 2020/0094675 A1 | 3/2020 | Johnston et al. | |
| 2020/0148058 A1* | 5/2020 | Eschenburg | B60K 17/36 |

* cited by examiner

WHEEL END DISCONNECT ASSEMBLY AND VEHICLE HAVING A WHEEL END DISCONNECT ASSEMBLY

FIELD

The present disclosure relates to a wheel end disconnect assembly and a vehicle having a wheel end disconnect assembly.

BACKGROUND

The statements in this section merely provide background information related to the present disclosure and may not constitute prior art.

Some conventional vehicles include wheel end disconnect assemblies that have a shift fork and a shift ring for moving the vehicle between a two-wheel-drive mode and a four-wheel-drive mode. The shift fork translates linearly back and forth to move the shift ring between a connected position in which the axle shaft is fixed for rotation with a vehicle wheel, and a disconnected position in which the axle shaft and the vehicle wheel rotate relative to each other. Such wheel end disconnect assemblies are time consuming in regard to shifting the vehicle between the two-wheel-drive mode and the four-wheel-drive mode. Furthermore, conventional wheel end disconnect assemblies are not typically designed for the quicker shifting and/or higher duty cycles required by some electric vehicles, for example. The present disclosure provides a wheel end disconnect assembly that reduces the time it takes for the vehicle to shift between the two-wheel-drive mode and the four-wheel-drive mode, which, in some applications, can reduce overall wear and can increase durability of the wheel end disconnect assembly.

SUMMARY

This section provides a general summary of the disclosure and is not a comprehensive disclosure of its full scope or all of its features.

In one form, the present disclosure provides a wheel end disconnect assembly that includes a housing, a shift ring, a shift fork and an actuator. The shift ring is supported for axial translation along an axis relative to the housing between a connected position in which the shift ring couples an input member to a wheel hub for rotation therewith and a disconnected position in which the input member and the wheel hub are rotatable relative to each other. The shift fork includes a first arm portion, a second arm portion, and an input portion extending from a junction of the first and second arm portions. The shift fork is pivotably coupled to the housing at the junction of the first and second arm portions. The actuator is configured to move the input portion to pivot the first and second arm portions such that the first and second arm portions translate the shift ring between the connected and disconnected positions.

In some configurations of the wheel end disconnect assembly of the above paragraph, the actuator is a solenoid.

In some configurations of the wheel end disconnect assembly of any one or more of the above paragraphs, the actuator is a bi-stable solenoid.

In some configurations of the wheel end disconnect assembly of any one or more of the above paragraphs, the actuator is operable between a first state in which a constant latching force of the actuator retains the shift ring in the disconnected position, and a second state in which the constant latching force of the actuator retains the shift ring in the connected position.

In some configurations of the wheel end disconnect assembly of any one or more of the above paragraphs, the shift fork has a pivot point between a location where the input portion is drivingly engaged with the actuator and a location where ends of the first and second arm portions engage the shift ring.

In some configurations of the wheel end disconnect assembly of any one or more of the above paragraphs, an end of the first arm portion and an end of the second arm portion are diametrically opposed to each other.

In some configurations of the wheel end disconnect assembly of any one or more of the above paragraphs, an end of the first arm portion includes a pin extending therefrom and engaging the shift ring and an end of the second arm portion includes a pin extending therefrom and engaging the shift ring.

In some configurations of the wheel end disconnect assembly of any one or more of the above paragraphs, the first arm portion extends from the junction in a first circumferential direction about the shift ring and the second arm portion extends from the junction in an opposite circumferential direction about the shift ring.

In some configurations of the wheel end disconnect assembly of any one or more of the above paragraphs, the wheel end disconnect assembly further includes the input member and the wheel hub. The shift ring includes at least one set of splines. When the shift ring is in the connected position, at least one set of splines engages a first mating set of splines defined on the input member and a second mating set of splines defined on the wheel hub. When the shift ring is in the disconnected position, at least one set of splines is disengaged from the first mating set of splines or the second mating set of splines.

In some configurations of the wheel end disconnect assembly of any one or more of the above paragraphs, the wheel end disconnect assembly further includes a first sensor, a second sensor, and a controller. The first sensor is configured to measure a parameter indicative of a speed of the input member. The second sensor is configured to measure a parameter indicative of a speed of the wheel hub. The controller is in communication with the first sensor, the second sensor and the actuator. The controller is configured to actuate the actuator to pivot the shift fork to move the shift ring from the disconnected position to the connected position in response to a speed differential between the input member and the wheel hub being within a predetermined speed differential threshold.

In some configurations of the wheel end disconnect assembly of any one or more of the above paragraphs, the predetermined speed differential threshold is equal to or less than 50 revolutions per minute.

In another form, the present disclosure provides a wheel end disconnect assembly that includes a housing, a dog ring, a shift fork, and an actuator. The housing includes a first tab and a second tab extending from an inner circumferential surface. The dog ring is configured to translate axially between a connected position in which the dog ring couples an input member to a wheel hub for rotation therewith and a disconnected position in which the input member and the wheel hub are rotatable relative to each other. The shift fork includes an input portion, a first arm portion pivotably coupled to the first tab and having a distal end and a proximal end, and a second arm portion pivotably coupled to the second tab and having a distal end and a proximal end.

The proximal end of the first arm portion and the proximal end of the second arm portion extend from the input portion. The actuator is configured to move the input portion to pivot the first and second arm portions such that the first and second arm portions translate the dog ring between the connected and disconnected positions.

In some configurations of the wheel end disconnect assembly of the above paragraph, the actuator is a solenoid.

In some configurations of the wheel end disconnect assembly of any one or more of the above paragraphs, the actuator is a bi-stable solenoid.

In some configurations of the wheel end disconnect assembly of any one or more of the above paragraphs, the first arm portion is pivotably coupled to the first tab at a location between the proximal end of the first arm portion and the distal end of the first arm portion. The second arm portion is pivotably coupled to the second tab at a location between the proximal end of the second arm portion and the distal end of the second arm portion.

In some configurations of the wheel end disconnect assembly of any one or more of the above paragraphs, the distal end of the first arm portion and the distal end of the second arm portion engage the dog ring.

In yet another form, the present disclosure provides a wheel end disconnect system for selectively rotationally fixing an axle shaft and a wheel hub to each other. The system includes a first sensor, a second sensor, a housing, a shift ring, a shift fork, an actuator, and a controller. The first sensor is associated with the axle shaft and is configured to measure a parameter indicative of speed of the axle shaft. The second sensor is associated with the wheel hub and is configured to measure a parameter indicative of speed of the wheel hub. The shift ring is supported for axial translation relative to the housing between a connected position in which the shift ring couples the axle shaft to the wheel hub for rotation therewith and a disconnected position in which the axle shaft and the wheel hub are rotatable relative to each other. The shift fork is pivotably coupled to the housing. The shift fork being pivotable between a first position in which the shift fork positions the shift ring in the disconnected position and a second position in which the shift fork positions the shift ring in the connected position. The actuator is configured to pivot the shift fork between the first and second positions. The controller is in communication with the first sensor, the second sensor and the actuator. The controller is configured to cause the actuator to pivot the shift fork from the first position to the second position in response to a speed differential between the axle shaft and the wheel hub being within a predetermined speed differential threshold.

In some configurations of the wheel end disconnect system of the above paragraph, the predetermined speed differential threshold is equal to or less than 50 revolutions per minute.

In some configurations of the wheel end disconnect system of any one or more of the above paragraphs, the shift fork includes a first arm portion, a second arm portion, and an input portion extending from a junction of the first and second arm portions. The shift fork is pivotably coupled to the housing at the junction of the first and second arm portions.

In some configurations of the wheel end disconnect system of any one or more of the above paragraphs, the actuator is a bi-stable solenoid.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
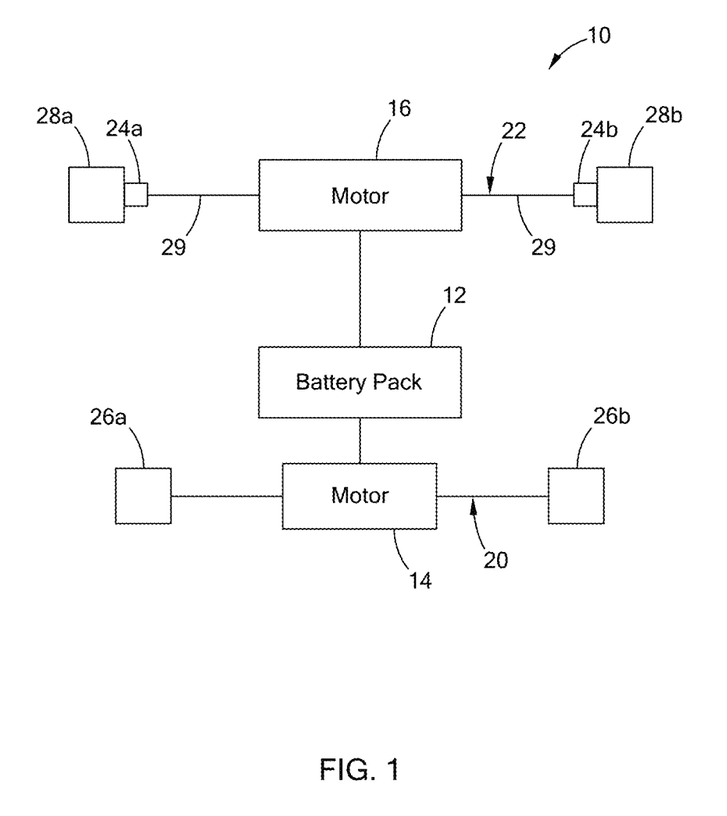
FIG. 1 is a schematic view of a vehicle including wheel end disconnect assemblies according to the principles of the present disclosure.

As shown in FIG. 1, a vehicle 10 such as an electric vehicle is provided. The vehicle 10 includes a battery pack 12, a first or rear motor 14 such as an electric motor, a second or front motor 16 such as an electric motor, a rear axle 20, a front axle 22, and a pair of wheel end disconnect assemblies 24*a*, 24*b*. The battery pack 12 may be rechargeable and may include lithium-ion batteries or any other suitable electrical power storage units. The battery pack 12 powers the rear motor 14 to drive a set of rear wheels 26*a*, 26*b* via the rear axle 20. Similarly, the battery pack 12 powers the front motor 16 to selectively drive a set of front wheels 28*a*, 28*b* via the front axle 22. The rear motor 14 may drive the rear wheels 26*a*, 26*b* at the same speed or at different speeds, such as with a differential (not shown) for example. Similarly, the front motor 16 may drive the front wheels 28*a*, 28*b* at the same speed or at different speeds, such as with a differential (not shown) for example. When the rear motor 14 drives the rear wheels 26a, 26b and the front motor 16 is decoupled from the front wheels 28a, 28b, and therefore, are not driving the front wheels 28a, 28b, the vehicle 10 is in a two-wheel-drive mode. When the rear motor 14 drives the rear wheels 26a, 26b and the front motor 16 is coupled to and driving the front wheels 28a, 28b, the vehicle 10 is in a four-wheel-drive mode. While the wheels 28a and 28b are described herein as front wheels and the wheels 26a and 26b are described herein as rear wheels, the principles of the present disclosure also apply when the wheels 28a and 28b are rear wheels and the wheels 26a and 26b are front wheels such that the motor 16 is a rear motor and the motor 14 is a front motor. It is also understood that the principles of the present disclosure can apply to vehicles with more than four wheels.

When the vehicle 10 is in the four-wheel-drive mode, each of the wheel end disconnect assemblies 24a, 24b rotationally fix a respective half shaft or input member 29 of the front axle 22 and a respective front wheel 28a, 28b to each other. In this way, the front motor 16 drives the front wheels 28a, 28b. When the vehicle 10 is in the two-wheel-drive mode, each of the wheel end disconnect assemblies 24a, 24b allows the respective half shaft 29 of the front axle 22 and the respective front wheel 28a, 28b to rotate relative to each other.

Figure 2:
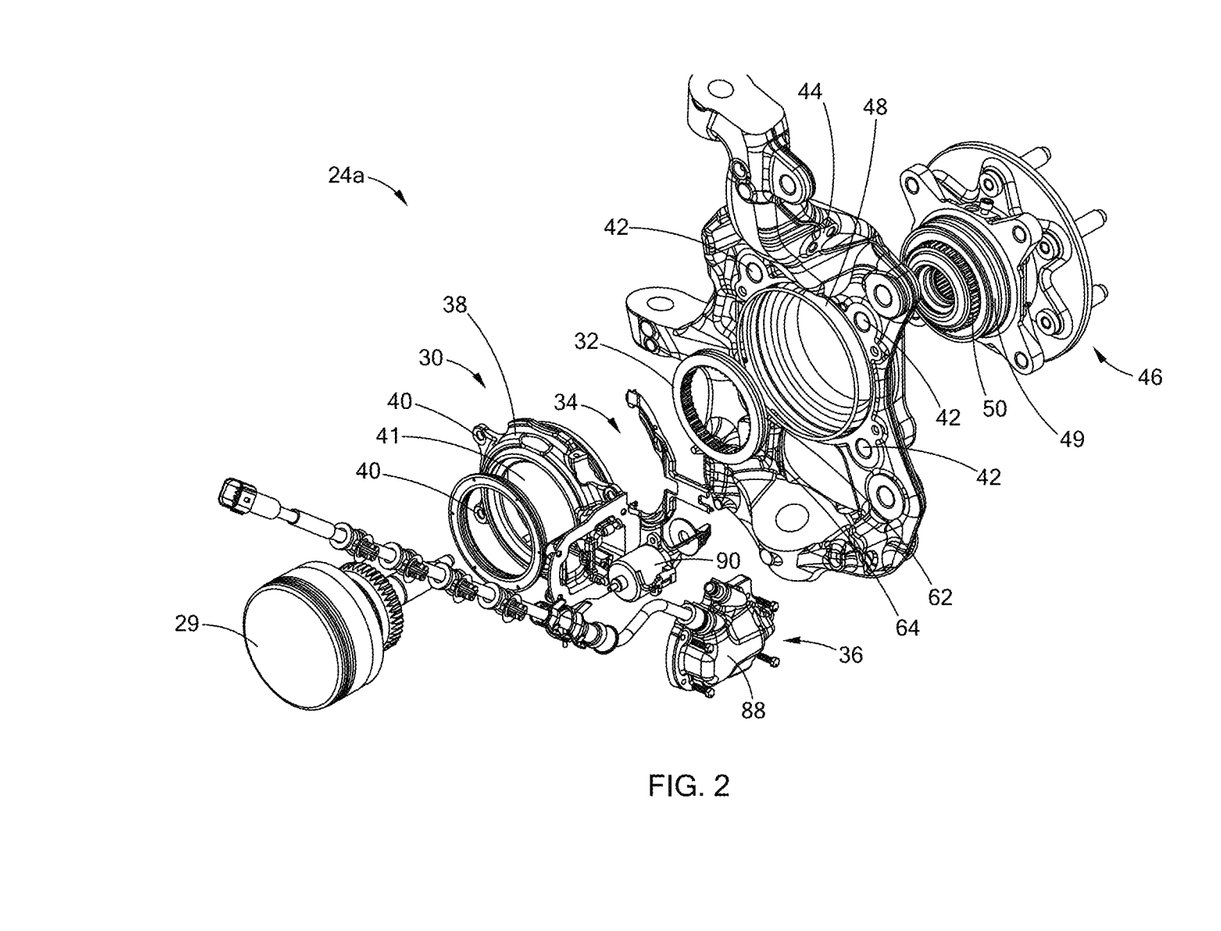
FIG. 2 is an exploded perspective view of one of the wheel end disconnect assemblies of FIG. 1.
Figure 6:
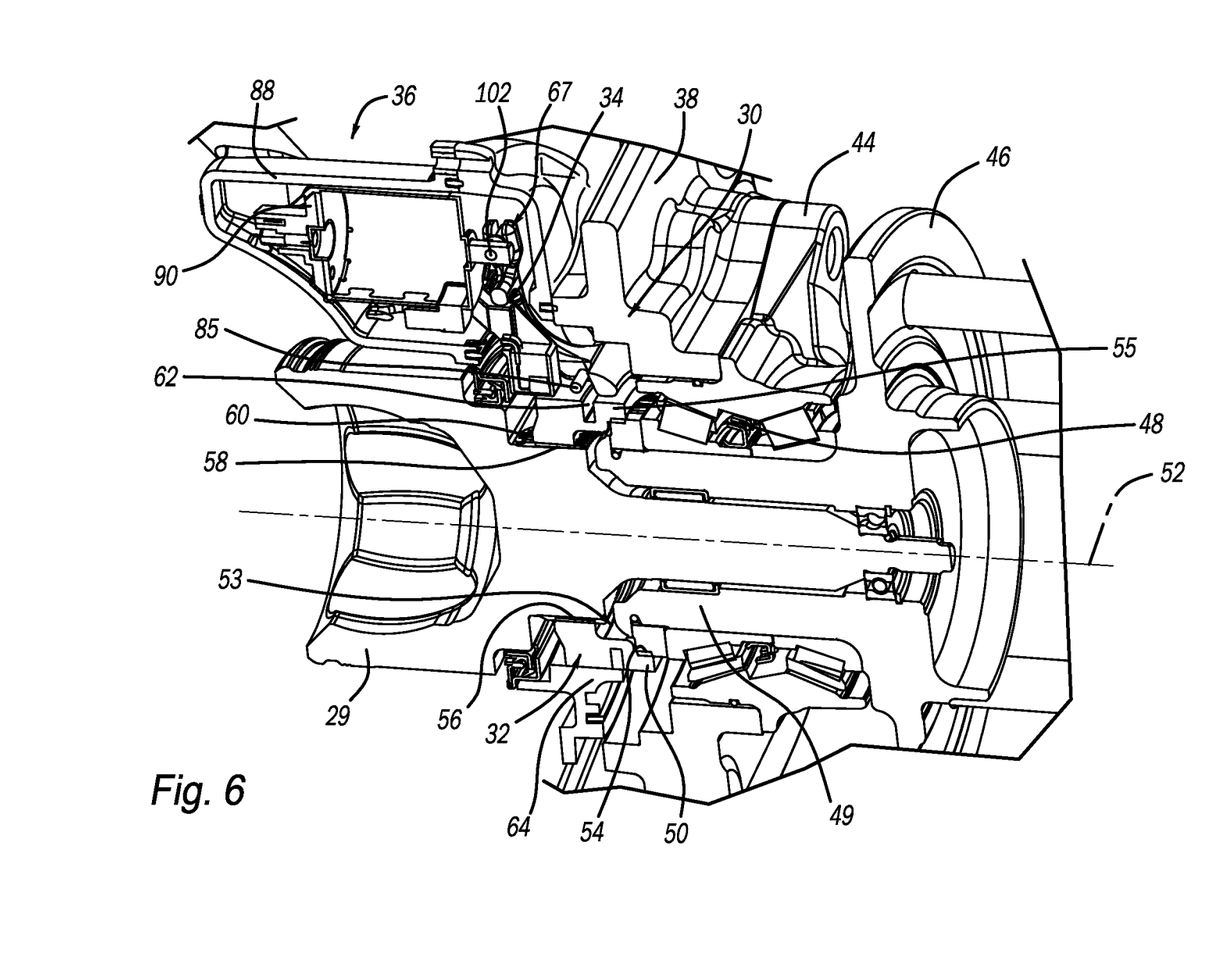
FIG. 6 is a cross-sectional perspective view of the wheel end disconnect assembly of FIG. 2 when the vehicle is in a four-wheel-drive mode.
Figure 7:
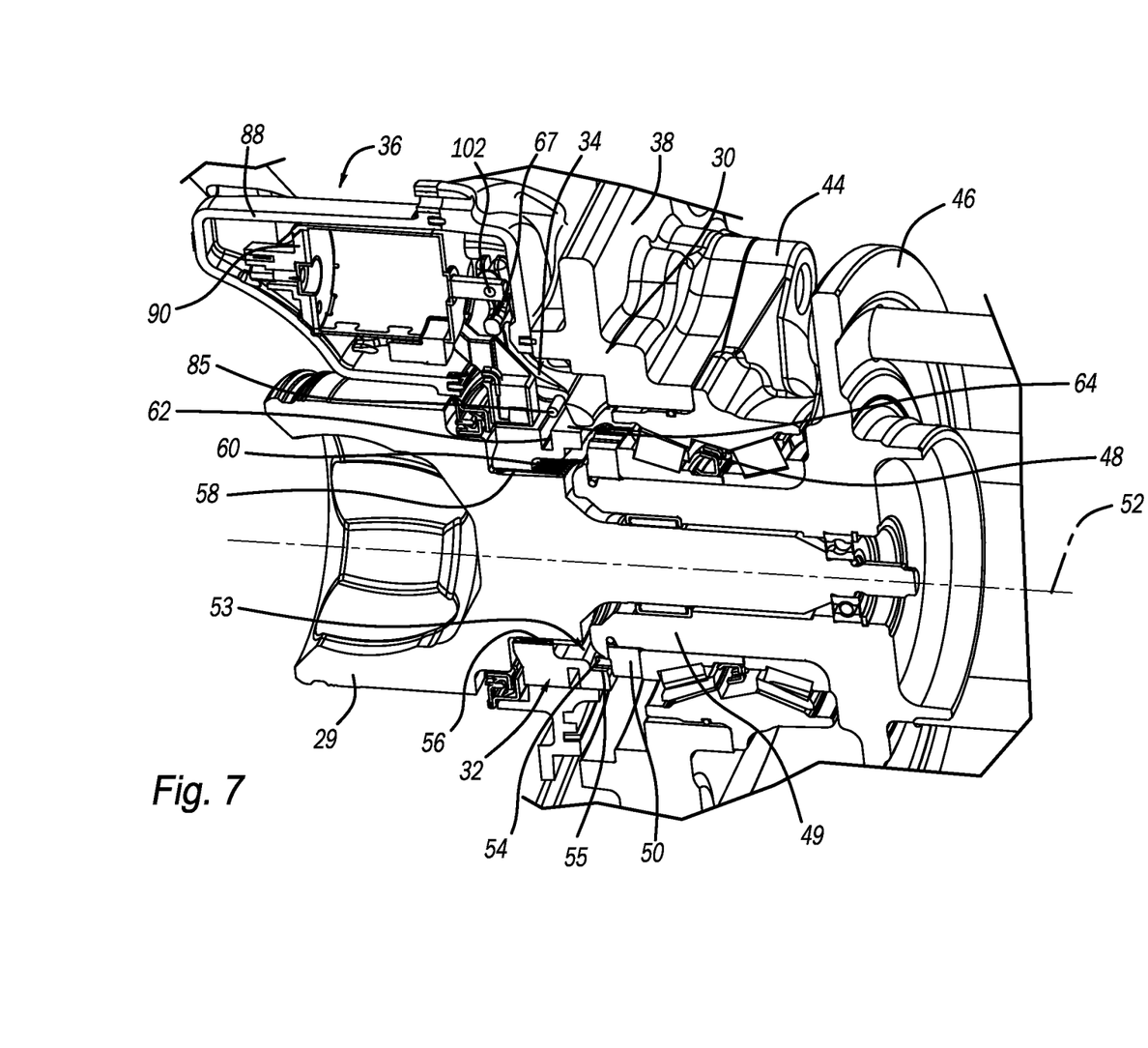
FIG. 7 is a cross-sectional perspective view of the wheel end disconnect assembly of FIG. 2 when the vehicle is in a two-wheel-drive mode.

As shown in FIGS. 2, 6, and 7, each of the wheel end disconnect assemblies 24a includes a housing 30, a dog or shift ring 32, a shift fork 34, and an actuation device 36. The housing 30 is generally annular-shaped and includes a body 38 and a plurality of mounting ends 40 (FIG. 2). The body 38 defines an opening 41. The plurality of mounting ends 40 extend outwardly from the body 38. A fastener (not shown) may extend through a respective mounting end 40 and a respective aperture 42 formed in a steering knuckle 44, thereby securing the housing 30 to the steering knuckle 44. The steering knuckle 44 is secured to a vehicle suspension system (not shown) and a steering system (not shown), and turns a respective front wheel 28a, 28b.

Figure 8:
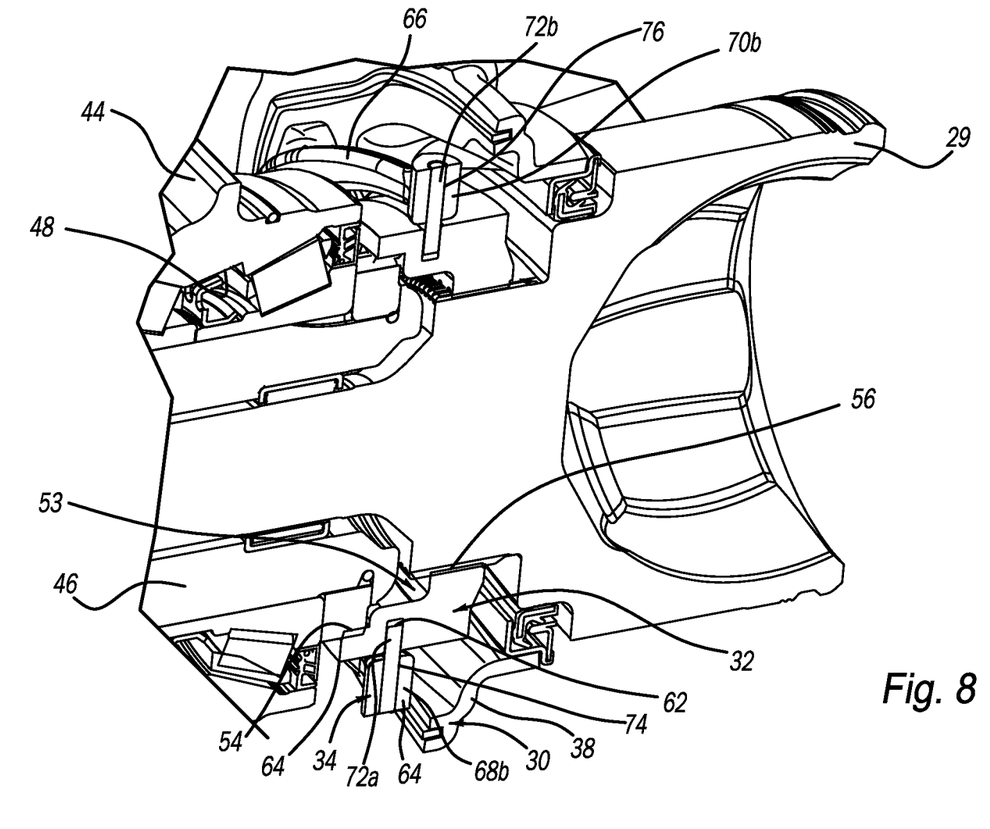
FIG. 8 is a cross-sectional perspective view of the wheel end disconnect assembly of FIG. 2, illustrating a connection between the shift fork of FIG. 3 and a dog ring of the wheel end disconnect assembly.

As shown in FIGS. 6-8, a wheel hub 46 is at least partially received in an opening 48 in the steering knuckle 44 and is fixed for rotation with a respective front wheel 28a, 28b. The wheel hub 46 includes an end portion 49 having splines or teeth 50 formed around an outer diametrical surface (the end portion 49 is partially received in the opening 48 in the steering knuckle 44).

The dog ring 32 is supported for axial translation along an axis 52 relative to the housing 30 between a connected position (FIG. 6) in which the dog ring 32 couples the input member 29 to the wheel hub 46 for rotation therewith and a disconnected position (FIG. 7) in which the input member 29 and the wheel hub 46 are rotatable relative to each other. The axis 52 is the rotational axis of the half shaft 29 and the wheel hub 46.

As shown in FIGS. 6 and 7, the dog ring 32 includes a stepped opening 53 having a first inner circumferential surface 54 and a second inner circumferential surface 56. The dog ring 32 also includes a first set of splines or teeth 55 formed on the first inner circumferential surface 54 and a second set of splines or teeth 58 formed on the second inner circumferential surface 56. In the example provided, the first inner circumferential surface 54 has a diameter that is greater than a diameter of the second inner circumferential surface 56, though other configurations can be used. When the dog ring 32 is in the connected position, the first set of teeth 55 are meshingly engaged with the teeth 50 of the wheel hub 46 and the second set of teeth 58 are meshingly engaged with teeth 60 formed around an outer diametrical surface of the input member 29. In this way, rotation of the input member 29 rotates the front wheel 28a, 28b via the dog ring 32 and the wheel hub 46. When the dog ring 32 is in the disconnected position, the first set of teeth 55 are disengaged from the teeth 50 of the wheel hub 46 and the second set of teeth 58 are meshingly engaged with the teeth 60 of the input member 29. In this way, the front wheel 28a, 28b rotates relative to the input member 29. In some configurations, when the dog ring 32 is in the disconnected position, the first set of teeth 55 may be engaged with the teeth 50 of the wheel hub 46 and the second set of teeth 58 may be disengaged from the teeth 60 of the input member 29 such that the front wheel 28a, 28b rotates relative to the input member 29. As shown in FIGS. 2 and 6-8, the dog ring 32 also includes an annular groove 62 formed in and around an outer diametrical surface 64 thereof at a middle portion.

The shift fork 34 is coupled to the housing 30 and is pivotable between a first position in which the shift fork 34 positions the shift ring 32 in the disconnected position (FIG. 7) and a second position in which the shift fork 34 positions the shift ring 32 in the connected position (FIG. 6).

Figure 3:
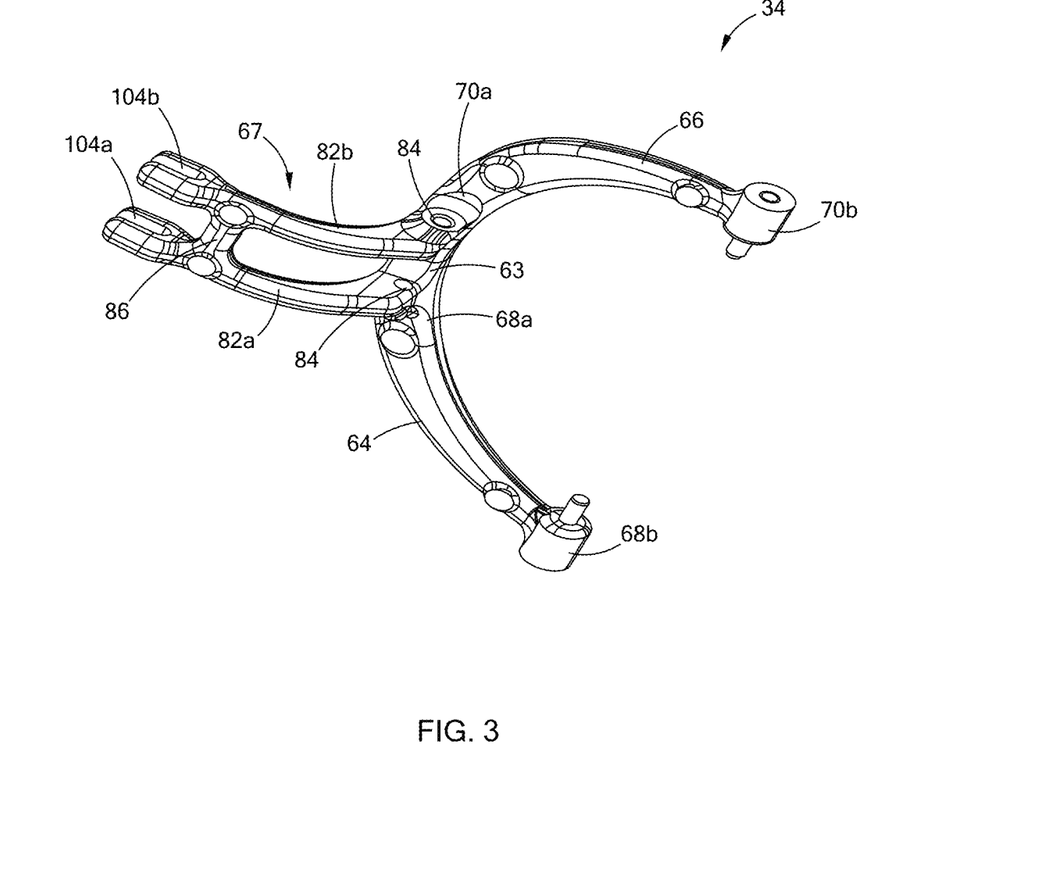
FIG. 3 is a perspective view of a shift fork of the wheel end disconnect assembly of FIG. 2.
Figure 4:
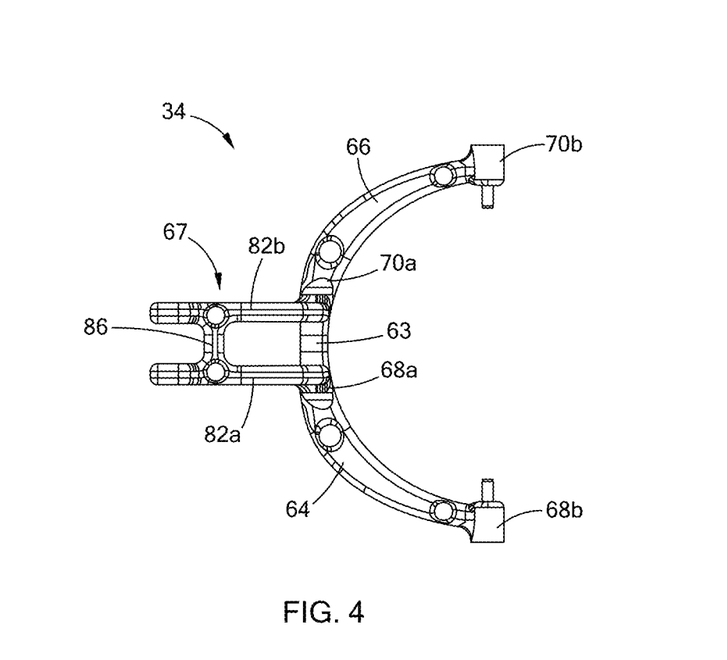
FIG. 4 is a bottom view of the shift fork of FIG. 3.
Figure 5:
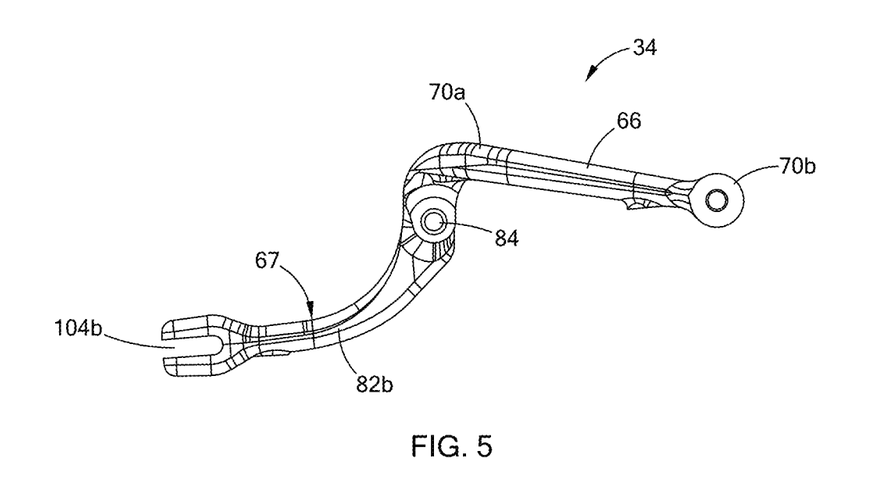
FIG. 5 is a side view of the shift fork of FIG. 3.

With reference to FIGS. 3-5, an example shift fork 34 is provided. The shift fork 34 is generally Y-shaped and includes a first arm portion 64, a second arm portion 66, and an input portion 67 extending from a junction 63 of the first and second arm portions 64, 66. The first arm portion 64 includes a proximal end 68a and a distal end 68b. The first arm portion 64 extends from the junction 63 in a first circumferential direction about the dog ring 32 (the proximal end 68a extends from the junction 63). The second arm portion 66 cooperates with the first arm portion 64 to form a semi-circle (FIG. 4). The second arm portion 66 also includes a proximal end 70a and a distal end 70b. The second arm portion 66 extends from the junction 63 in a second circumferential direction that is opposite the first circumferential direction (the proximal end 70a extends from the junction 63). The distal end 68b of the first arm portion 64 and the distal end 70b of the second arm portion 66 are diametrically opposed to each other. As shown in FIG. 8, a guide pin 72a extends through an opening 74 in the distal end 68b and is received in the groove 62 of the dog ring 32. Similarly, a guide pin 72b extends through an opening 76 in the distal end 70b and is received in the groove 62 of the dog ring 32 on the diametrically opposite side of the dog ring 32. When the shift fork 34 moves between the first and second positions, the guide pins 72a, 72b engage and move the dog ring 32 between the disconnected and connected positions. In some configurations, the guide pin 72a may be fixed to the distal end 68b and the guide pin 72b may be fixed to the distal end 70b.

The input portion 67 is drivingly engaged with the actuation device 36 at one end (FIGS. 6 and 7) and extends from the junction 63 at another end. As shown in FIGS. 3 and 4, the input portion 67 includes first and second spaced apart members 82a, 82b. Each of the first and second members 82a, 82b may be arcuate and may include an aperture 84. A pin 85 (FIGS. 6 and 7) extends through the apertures 84 and into the housing 30, thereby pivotably coupling the shift fork 34 to the housing 30 (the shift fork 34 is pivotably coupled to the housing 30 at or near the junction 63). The first and second members 82a, 82b may be interconnected via a connecting member 86.

The fulcrum or pivot point (i.e., the pin 85) of the shift fork 34 is located between a location where the input portion 67 is drivingly engaged with the actuation device 36 and a location where the distal ends 68b, 70b of the first and second arm portions 64, 66, respectively, engage the dog ring 32. In this way, the shift fork 34 has design flexibility by being able to adjust the distance between the pivot point and the location where the input portion 67 is drivingly engaged with the actuation device 36 (i.e., input side), and the distance between the pivot point (i.e., the pin 85) and the location where the distal ends 68b, 70b engage the dog ring 32 (i.e., output side). This ratio of input side/output side is also known as the ideal mechanical advantage (IMA). For example, the time it takes for the shift fork 34 to move the dog ring 32 between the connected and disconnected positions can be decreased by moving the pivot point (i.e., the pin 85) closer toward the location where the input portion 67 is drivingly engaged with the actuation device 36, thereby reducing the IMA. In another example, the force applied from the shift fork 34 to the dog ring 32 may be increased by moving the pivot point (i.e., the pin 85) closer toward the location where the distal ends 68b, 70b engage the dog ring 32 thereby increasing the IMA.

The actuation device 36 includes a housing 88 and an actuator 90 disposed within the housing 88. The housing 88 may be formed of one or more shells. The actuator 90 may be a bi-stable solenoid and may be drivingly coupled to the shift fork 34. The actuator 90 may be configured to move the input portion 67 of the shift fork 34 to pivot the shift fork 34 such that the first and second arm portions 64, 66 translate the shift ring 32 between the connected and disconnected positions. The actuator 90 is operable in a first state in which a constant latching force of the actuator 90 retains the shift ring 32 in the disconnected position (the vehicle 10 in the two-wheel-drive mode), and a second state in which the constant latching force of the actuator 90 retains the shift ring 32 in the connected position (the vehicle 10 in the four-wheel-drive mode). That is, when the actuator 90 is in the first state and the second state, the actuator 90 is unpowered (zero current provided to the actuator 90).

Figure 9:
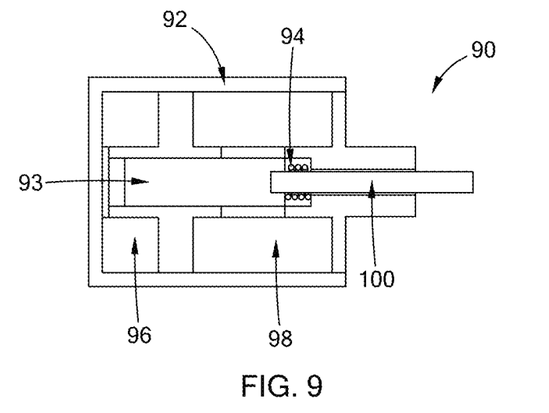
FIG. 9 is a cross-sectional view of an actuator of the wheel end disconnect assembly of FIG. 2 in a first latching position.
Figure 10:
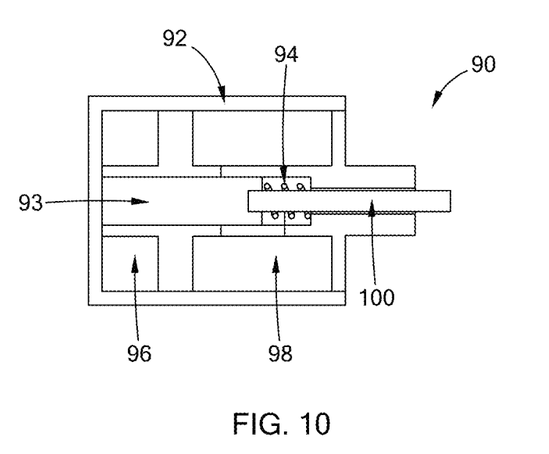
FIG. 10 is a cross-sectional view of the actuator of FIG. 9 in a second latching position.

As shown in FIGS. 9 and 10, an example actuator 90 may include, inter alia, a housing 92, an armature 93, a spring 94, a permanent magnet 96, a coil 98 and a shaft 100. The armature 93, the spring 94, the permanent magnet 96, and the coil 98 are disposed in the housing 92, and the shaft 100 is at least partially disposed within the housing 92. The shaft 100 is drivingly coupled to the input portion 67 of the shift fork 34 via a pin 102 (FIGS. 6 and 7; the pin 102 extends through the shaft 100 and extends through slots 104a, 104b in the first and second members 82a, 82b, respectively). In the example provided, the pin 102 can slide along the slots 104a, 104b and the pin 102 may also rotate in the slots 104a, 104b relative to the input portion 67 of the shift fork 34.

As shown in FIG. 9, when the actuator 90 is operable in the first state, the coil 98 is de-energized and the permanent magnet 96 provides a constant magnetic field to overcome the force of the spring 94 and hold the armature 93 in a first latched position and the shift ring 32 in the disconnected position. To move the actuator 90 from the first state to the second state, the coil 98 is energized which generates a magnetic field that overcomes the magnetic field of the permanent magnet 96, thereby moving the armature 93 to a second latched position. Moving the armature 93 to the second latched position as shown in FIG. 10 causes the shaft 100 to drive the shift fork 34 to the connected position. Once the armature 93 is in the second latched position and the shift fork 34 is in the connected position, the coil 98 is de-energized and the constant magnetic field of the permanent magnet 96 holds the armature 93 in the second latched position and the shift ring 32 in the connected position. The coil 98 being energized in an opposite polarity reverses the process (allows the spring 94 to return the armature 93 from the second latched position to the first latched position).

Figure 11:
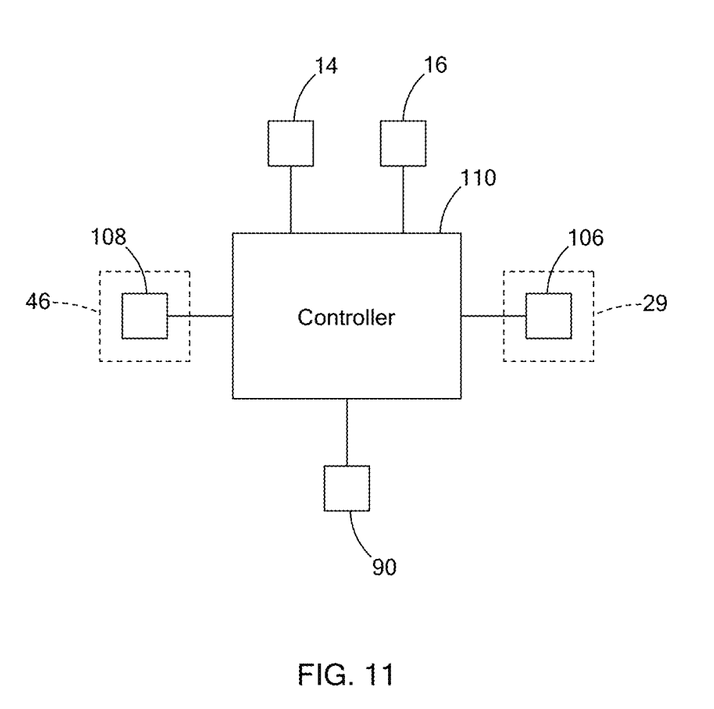
FIG. 11 is a schematic block diagram showing components of the wheel end disconnect assembly of FIG. 2.

As shown in FIG. 11, a first sensor 106 is associated with a respective half shaft 29 (e.g., coupled to the half shaft 29 or fixed to the housing 30 or steering knuckle 44 and having a sensor target coupled to half shaft 29) and is configured to measure a parameter indicative of rotational speed of the half shaft 29. For example, the first sensor 106 may be a tachometer and may measure the revolutions per minute (RPM) of the respective half shaft 29. A second sensor 108 is associated with a respective wheel hub 46 (e.g., coupled to the wheel hub 46 or fixed to the housing 30 or steering knuckle 44 and having a sensor target coupled to wheel hub 46) and is configured to measure a parameter indicative of rotational speed of the wheel hub 46. For example, the second sensor 108 may be a tachometer and may measure the revolutions per minute (RPM) of the respective wheel hub 46. A third sensor 109 may be associated with (e.g., coupled to) the actuator 90 and may be configured to detect a position of the shaft 100 of the actuator 90. That is, when the actuator 90 is in the first state and the dog ring 32 is in the disconnected position, the shaft 100 will be in a first position, and when the actuator 90 is in the second state and the dog ring 32 is in the connected position, the shaft 100 will be in a second position. In this way, the sensor 109 can determine the position of the shaft 100, which is then used to determine the mode of the vehicle 10 (whether the vehicle 10 is in the two-wheel-drive mode or the four-wheel-drive mode).

A controller 110 is in communication with the motors 14, 16, the actuator 90 and the first sensor 106,108, 109. The controller 110 is configured to cause the actuator 90 to pivot the shift fork 34 between the first position and the second position based on operating conditions of the vehicle 10 (e.g., road conditions, vehicle speed, wheel slip, user settings). For example, the controller 110 may be configured to cause the actuator 90 to pivot the shift fork 34 from the first position to the second position in response to a four-wheel-drive mode being selected and a speed differential of the half shaft 90 and the wheel hub 46 being within a predetermined speed differential threshold. The predetermined speed differential threshold may be equal to or less than 50 RPM. If the speed differential of the half shaft 90 and the wheel hub 46 is not within the predetermined differential threshold, the controller 110 may increase or decrease the speed of the half shaft 90 via the motor 16 until the speed differential of the half shaft 90 and the wheel hub 46 is within the predetermined speed differential threshold.

While the wheel end disconnect assembly 24a is described in detail herein, the wheel end disconnect assembly 24b can be similar to the wheel end disconnect assembly 24a, and therefore, will not be described again in detail.

The shift fork 34 of the present disclosure provides the benefit of not side loading the armature 93 of the actuator 90, which increases the net output of the actuator 90. The shift fork 34 of the present disclosure also provides the pivot point between a location where the input portion 67 is drivingly engaged with the actuation device 36 and a location where the distal ends 68b, 70b engage the dog ring 32. In this way, the shift fork 34 has more design flexibility such that it can be used with different vehicle architectures. The actuation device 36 of the present disclosure also provides the benefit of quickly shifting between two-wheel-drive mode and four-wheel-drive mode (e.g., between 0.025 seconds-0.135 seconds), which reduces the time the dog ring 32 is exposed to relative rotation to the wheel hub 46, thereby reducing overall wear and increasing durability. Short shift times also reduces electricity being consumed, which maximizes the vehicle range in electric vehicles.

It should be understood that although the wheel end disconnect assemblies 24a, 24b described in the present disclosure is with respect to an electric vehicle, the wheel end disconnect assemblies 24a, 24b may be used in vehicles having an internal combustion engine.

Figure 12:
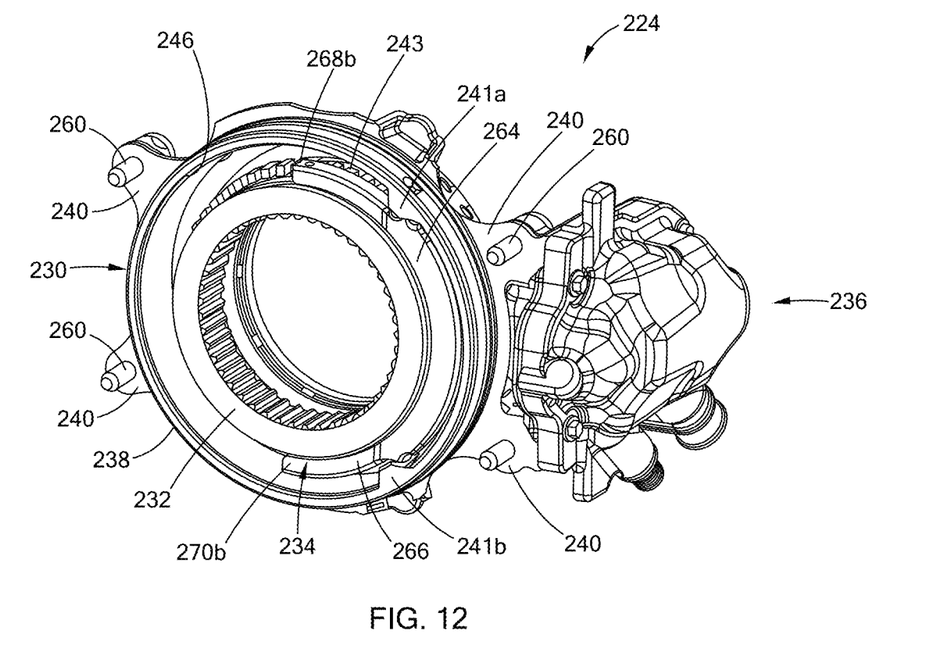
FIG. 12 is a cross-sectional view of another wheel end disconnect assembly in accordance with the principles of the present disclosure.
Figure 13:
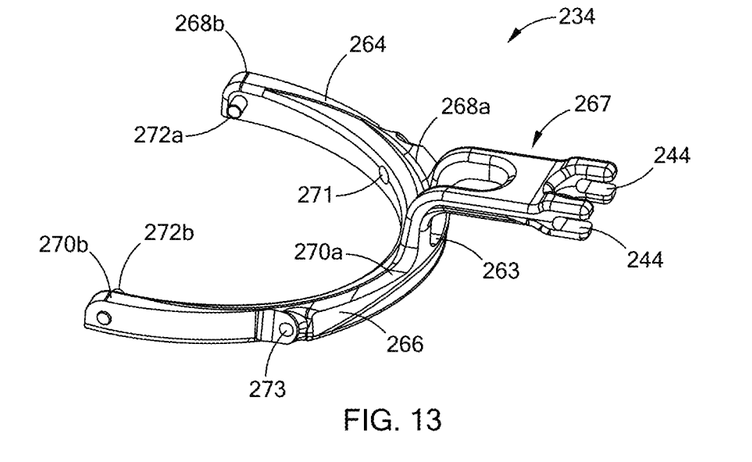
FIG. 13 is a perspective view of a shift fork of the wheel end disconnect assembly of FIG. 12.

With reference to FIGS. 12 and 13, another wheel end disconnect assembly 224 is provided. The wheel end disconnect assembly 224 may be incorporated into vehicle 10 described above instead of wheel end disconnect assemblies 24a, 24b. The structure and function of the wheel end disconnect assembly 224 may be similar or identical to that of the wheel end disconnect assemblies 24a, 24b described above, apart from any exceptions noted below.

The wheel end disconnect assembly 224 includes a housing 230, a dog or shift ring 232, a shift fork 234, and an actuation device 236. The housing 230 is generally annular-shaped and includes a body 238, a plurality of mounting ends 240, and a pair of tabs 241a, 241b. The body 238 defines an opening 246. The plurality of mounting ends 240 extend outwardly from the body 238. A fastener 260 may extend through a respective mounting end 240 and a respective aperture (not shown) formed in the steering knuckle (not shown, similar to steering knuckle 44 shown in FIG. 2), thereby securing the housing 230 to the steering knuckle. The pair of tabs 241a, 241b extend radially inwardly from an inner circumferential surface 243 of the housing 230.

The structure and function of the shift ring 232 may be similar or identical to that of the shift ring 32 described above, and therefore, will not be described again in detail.

The shift fork 234 is Y-shaped and includes a first arm portion 264, a second arm portion 266, and an input portion 267 extending from a junction 263 of the first and second arm portions 264, 266. The first arm portion 264 includes a proximal end 268a and a distal end 268b. The first arm portion 264 includes a first pivot opening 271 at a location between the proximal end 268a and the distal end 268b. The tab 241a extends into the first pivot opening 271, thereby pivotably coupling the first arm portion 264 to the housing 230. The second arm portion 266 also includes a proximal end 270a and a distal end 270b. The second arm portion 266 includes a second pivot opening 273 at a location between the proximal end 270a and the distal end 270b. The tab 241b extends into the second pivot opening 273, thereby pivotably coupling the second arm portion 266 to the housing 230. In an alternative configuration, not specifically shown, a corresponding pin may extend from each arm portion 264, 266 into an aperture in the housing 230 to pivotably couple the arm portions 264, 266 to the housing 230. Returning to the example provided, the distal end 268b of the first arm portion 264 and the distal end 270b of the second arm portion 266 are diametrically opposed to each other. A guide pin 272a extends through an opening in the distal end 268b and is received in a groove (not shown) of the dog ring 232. Similarly, a guide pin 272b extends through an opening in the distal end 270b and is received in the groove of the dog ring 232.

The input portion 267 is drivingly engaged with the actuation device 236 at one end and extends from the junction 263 at another end. A pin (not shown) extends through the actuation device 236 and through slots 244 of the input portion 267, thereby drivingly engaging the input portion 267 to the actuation device 236.

The structure and function of the actuation device 236 may be similar or identical to that of the actuation device 36 described above, and therefore, will not be described again in detail.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A wheel end disconnect assembly comprising:
   a housing;
   a shift ring supported for axial translation along an axis relative to the housing between a connected position in which the shift ring couples an input member to a wheel hub for rotation therewith and a disconnected position in which the input member and the wheel hub are rotatable relative to each other;

a shift fork including a first arm portion, a second arm portion, and an input portion extending from a junction of the first and second arm portions, the shift fork pivotably coupled to the housing at the junction of the first and second arm portions;

a pivot pin extending through the input portion of the shift fork and into the housing to pivotably couple the shift fork to the housing; and an actuator configured to move the input portion to pivot the first and second arm portions such that the first and second arm portions translate the shift ring between the connected and disconnected positions, wherein the input portion includes a first end connected to the junction and a second end connected to the actuator, and wherein the input portion is curved from the first end to the second end.

2. The wheel end disconnect assembly according to claim 1, wherein the actuator is a solenoid.

3. The wheel end disconnect assembly according to claim 1, wherein the actuator is a bi-stable solenoid.

4. The wheel end disconnect assembly according to claim 1, wherein the actuator is operable between a first state in which a constant latching force of the actuator retains the shift ring in the disconnected position, and a second state in which the constant latching force of the actuator retains the shift ring in the connected position.

5. The wheel end disconnect assembly according to claim 1, wherein the shift fork has a pivot point between a location where the input portion is drivingly engaged with the actuator and a location where ends of the first and second arm portions engage the shift ring.

6. The wheel end disconnect assembly according to claim 1, wherein an end of the first arm portion and an end of the second arm portion are diametrically opposed to each other.

7. The wheel end disconnect assembly according to claim 1, wherein an end of the first arm portion includes a pin extending therefrom and engaging the shift ring and an end of the second arm portion includes a pin extending therefrom and engaging the shift ring.

8. The wheel end disconnect assembly according to claim 1, wherein the first arm portion extends from the junction in a first circumferential direction about the shift ring and the second arm portion extends from the junction in an opposite circumferential direction about the shift ring.

9. The wheel end disconnect assembly according to claim 1, further comprising:
the input member; and
the wheel hub,
wherein the shift ring includes at least one set of splines,
wherein when the shift ring is in the connected position, the at least one set of splines engages a first mating set of splines defined on the input member and a second mating set of splines defined on the wheel hub,
wherein when the shift ring is in the disconnected position, the at least one set of splines is disengaged from the first mating set of splines or the second mating set of splines.

10. The wheel end disconnect assembly according to claim 9, further comprising:
a first sensor configured to measure a parameter indicative of a speed of the input member;
a second sensor configured to measure a parameter indicative of a speed of the wheel hub; and
a controller in communication with the first sensor, the second sensor and the actuator, the controller configured to actuate the actuator to pivot the shift fork to move the shift ring from the disconnected position to the connected position in response to a speed differential between the input member and the wheel hub being within a predetermined speed differential threshold.

11. The wheel end disconnect assembly according to claim 10, wherein the predetermined speed differential threshold is equal to or less than 50 revolutions per minute.

12. A wheel end disconnect assembly comprising:
a housing including a first tab and a second tab extending from an inner circumferential surface;
a dog ring configured to translate axially between a connected position in which the dog ring couples an input member to a wheel hub for rotation therewith and a disconnected position in which the input member and the wheel hub are rotatable relative to each other;
a shift fork including an input portion, a first arm portion pivotably coupled to the first tab and having a distal end and a proximal end, and a second arm portion pivotably coupled to the second tab and having a distal end and a proximal end, the proximal end of the first arm portion and the proximal end of the second arm portion extending from the input portion; and
an actuator configured to move the input portion to pivot the first and second arm portions such that the first and second arm portions translate the dog ring between the connected and disconnected positions.

13. The wheel end disconnect assembly according to claim 12, wherein the actuator is a solenoid.

14. The wheel end disconnect assembly according to claim 12, wherein the actuator is a bi-stable solenoid.

15. The wheel end disconnect assembly according to claim 12, wherein the first arm portion is pivotably coupled to the first tab at a location between the proximal end of the first arm portion and the distal end of the first arm portion, and wherein the second arm portion is pivotably coupled to the second tab at a location between the proximal end of the second arm portion and the distal end of the second arm portion.

16. The wheel end disconnect assembly according to claim 12, wherein the distal end of the first arm portion and the distal end of the second arm portion engage the dog ring.

17. A wheel end disconnect system for selectively rotationally fixing an axle shaft and a wheel hub to each other, the system comprising:
a first sensor associated with the axle shaft and configured to measure a parameter indicative of speed of the axle shaft;
a second sensor associated with the wheel hub and configured to measure a parameter indicative of speed of the wheel hub;
a housing;
a shift ring supported for axial translation relative to the housing between a connected position in which the shift ring couples the axle shaft to the wheel hub for rotation therewith and a disconnected position in which the axle shaft and the wheel hub are rotatable relative to each other;
a shift fork pivotably coupled to the housing, the shift fork being pivotable between a first position in which the shift fork positions the shift ring in the disconnected position and a second position in which the shift fork positions the shift ring in the connected position;
an actuator configured to pivot the shift fork between the first and second positions; and
a controller in communication with the first sensor, the second sensor and the actuator, the controller configured to cause the actuator to pivot the shift fork from the first position to the second position in response to a speed differential between the axle shaft and the wheel hub being within a predetermined speed differential threshold.

18. The system according to claim 17, wherein the predetermined speed differential threshold is equal to or less than 50 revolutions per minute.

19. The system according to claim 17, wherein the shift fork includes a first arm portion, a second arm portion, and an input portion extending from a junction of the first and second arm portions, and wherein the shift fork is pivotably coupled to the housing at the junction of the first and second arm portions.

20. The system according to claim 17, wherein the actuator is a bi-stable solenoid.

* * * * *